Aug. 14, 1951     H. W. L. KEARNS     2,564,068
OPTICAL PROJECTOR INDICATOR FOR HORIZONTAL BORING MACHINES
Filed Feb. 28, 1950     4 Sheets-Sheet 2

INVENTOR
HENRY WARD LIONEL KEARN
BY Francis E. Boyce
ATTORNEY

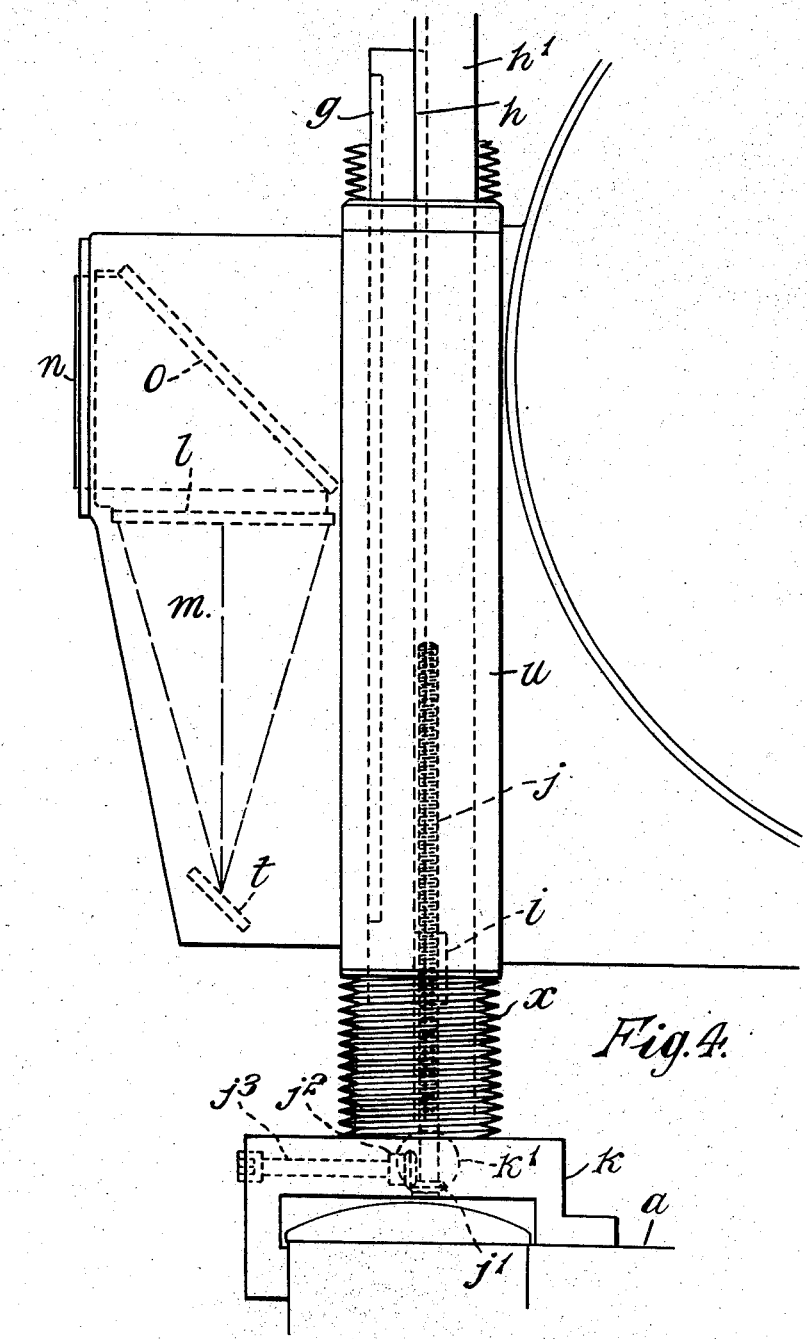

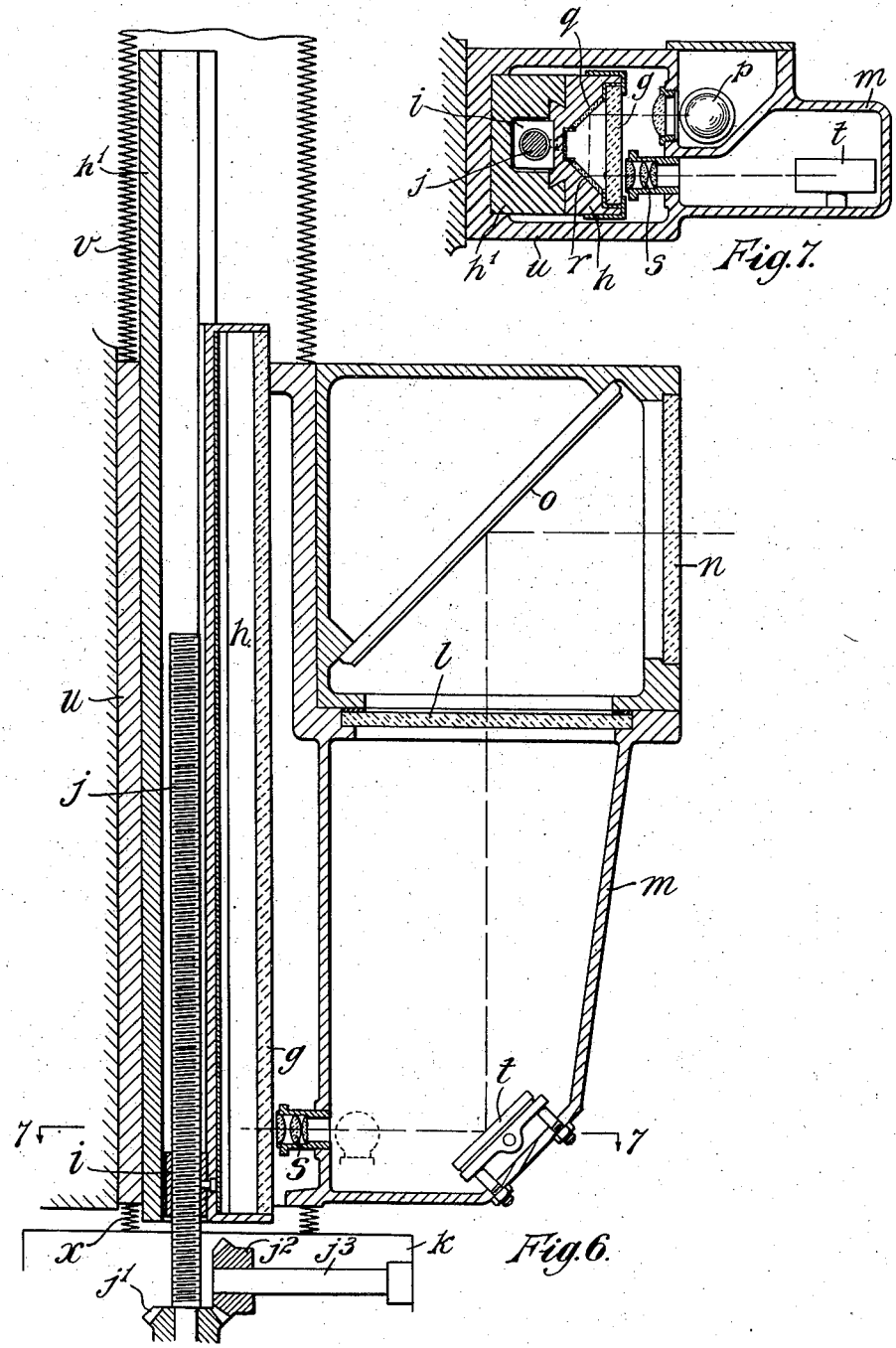

Patented Aug. 14, 1951

2,564,068

UNITED STATES PATENT OFFICE 2,564,068

OPTICAL PROJECTOR INDICATOR FOR HORIZONTAL BORING MACHINES

Henry Ward Lionel Kearns, Altrincham, England, assignor to H. W. Kearns & Co. Limited, Broadheath, England Application February 28, 1950, Serial No. 146,751
In Great Britain June 30, 1949

5 Claims. (Cl. 88—24)

1

This invention relates to means for measuring the vertical displacements of the spindle slides of horizontal boring machines, whether or not such machines are provided with face plates whereby they are adapted also for surfacing.

The object of the invention is to provide the spindle slide of a horizontal boring machine with a measuring system, which comprises the illumination of a bar marked with a scale of distances, and an optical viewing system whereby the illuminated portion of the scale bar can be viewed in relation to a vernier scale, the scale bar and vernier scale being relatively displaceable. For convenient illumination of the scale bar and viewing of the illuminated portion thereof in relation to the vernier scale, the scale bar is transparent and is illuminated by a beam of light passing therethrough, and which, after passing therethrough, passes through an optical system and is directed by reflection on to a translucent screen, marked with the vernier scale and whereon a magnified image of the illuminated portion of the scale bar can be viewed. The illumination of the scale bar is, for instance, effected by an electric lamp in front of the scale bar, and the beam from which passes through the scale bar to the back thereof where it is reflected laterally and again forwardly to pass through the portion of the scale bar which is to be read.

According to the invention, an upright scale bar of considerably less length than the total range of displacement of the spindle slide of a horizontal boring machine, is vertically adjustable relatively to the column on which the spindle slide is adjustable with means for finely vertically adjusting the scale bar relatively to the column, and a viewing screen marked with a vernier scale is provided on and displaceable with the spindle slide together with means for illuminating a portion of the scale bar and means for directing an image of such illuminated portion on to the screen.

Although it is usual to adjust a vernier relatively to a scale, it will be appreciated that as the vernier scale is marked on a viewing screen, it would be difficult to arrange for the vernier to be adjustable.

In using the optical measuring arrangement, the scale bar is vertically adjusted until the image of its zero coincides with the zero of the vernier scale on the viewing screen. Adjustments of the spindle slide can then be measured on viewing the changing image of the scale bar on the screen.

A horizontal boring machine having an optical measuring arrangment and details of the optical measuring arrangement, are shown by way of example in the accompanying drawings, in which:

2

Figures 3, 5:
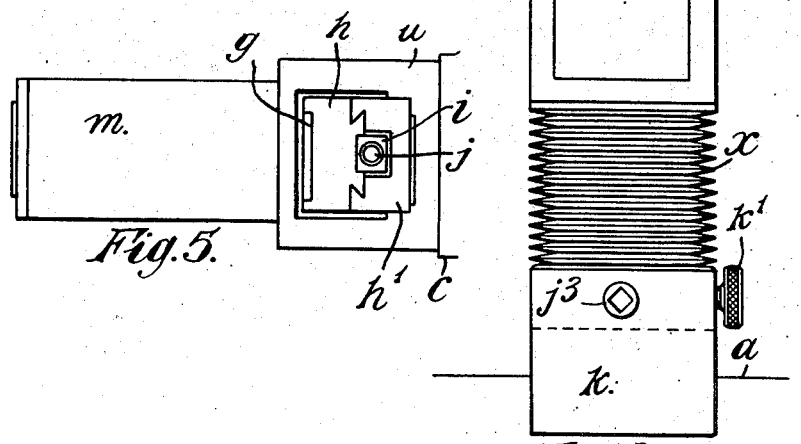

On a larger scale:

Fig. 3 is a front elevation,

Fig. 4 a side elevation and

Fig. 5 a plan of the casing containing the viewing screen of the apparatus.

On a still larger scale:

Fig. 6 is a sectional elevation, and

Fig. 7 a sectional plan on the line 7—7 of Fig. 6, showing the optical system.

Figure 1:
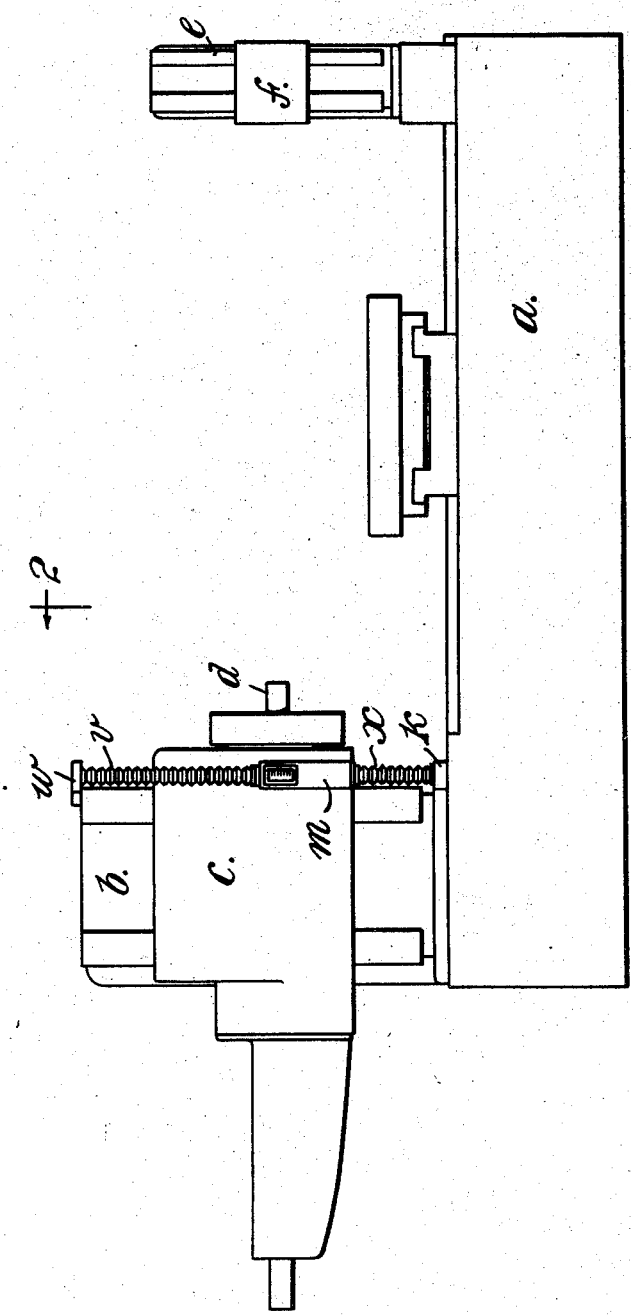
Fig. 1 is a diagrammatic side elevation of a horizontal boring machine.
Figure 2:
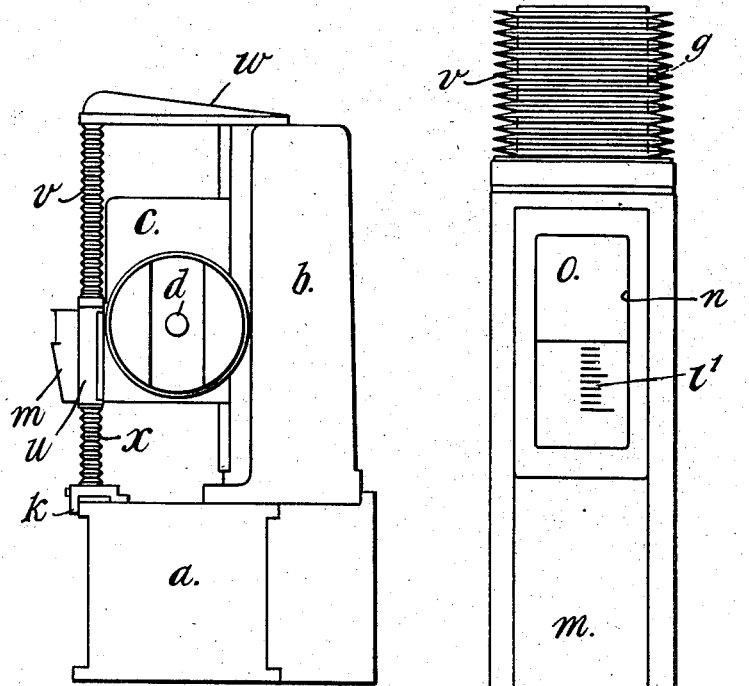
Fig. 2 is a corresponding diagrammatic outline of a sectional elevation on the line 2—2 of Fig. 1.

Referring to Figs. 1 and 2, $a$ is the bed plate of a horizontal boring machine. At one end of the bed plate $a$ a column $b$ upstands, on which a spindle slide $c$ is vertically adjustable, and in which the boring spindle $d$ of the machine is rotatably mounted. At the other end of the bed plate $a$ a boring bar stay $e$ upstands, on which the boring bar supporting bearing $f$ is vertically adjustable. The spindle slide $c$ and the boring bar supporting bearing $f$ are adjusted in unison and therefore only the displacement of the spindle slide $c$ along the column $b$ has to be observed. The present invention provides an optical viewing system whereby this displacement can be measured.

For the above purpose a transparent scale bar $g$, Figs. 3, 4 and 5, of considerably less length than the total possible vertical displacement of the spindle slide $c$, is mounted upright in a frame $h$, vertically displaceable along a supporting bar $h^1$, secured alongside the column $b$, by a dovetail guide groove, Fig. 5. The frame $h$ is fast with a screw sleeve or nut $i$ on a finely screw-threaded vertical feed screw $j$, journalled on a base plate $k$, mounted on the bed plate $a$ of the machine to project upwards alongside the spindle slide column $b$. The feed screw $j$ is rotated through a bevel gear $j^1$, $j^2$ by a horizontal shaft $j^3$ mounted in the base plate $k$. This shaft $j^3$ is turned by a key (not shown). A milled headed set screw $k^1$, screwing in the base plate $k$, is provided to bear against the lower end of and lock the feed screw $j$ from being inadvertently turned and thereby altering the setting of the scale bar $g$.

$l$ is a translucent viewing screen marked with a vernier scale $l^1$, which is mounted horizontally in the upper end of a casing $m$ secured to the spindle slide $c$. The scale $l^1$ of the screen $l$ is viewed through a vertical window aperture $n$ in the casing $m$ by a mirror $o$ inclined downwards at 45° within the casing $m$ above the screen $l$.

At the lower end of the casing $m$ the scale bar $g$ is illuminated by an electric lamp $p$, Figs. 6 and 7, the beam from which, after passing through the transparent scale bar g, is reflected laterally and back through the scale bar g, by a pair of opposed mirrors q, r inclined at 45° behind the scale bar g. The beam on leaving the scale bar g passes through an optical system s, which, by a mirror t inclined upwards at 45° at the lower end of the casing m, throws a magnified image of the illuminated portion of the scale marked on the scale bar g opposite the optical system s, on to the viewing screen l. Displacements of the spindle slide c along the column b can thus be measured by observing the displacements of the image of the scale bar g on the viewing screen l.

Before each displacement, the zero of the image of the scale bar g can, by adjustment of the scale bar g by its feed screw j, be brought into coincidence with the zero of the vernier scale marked on the viewing screen l.

The scale bar g with its frame h, on the supporting bar $h^1$, and its feed screw j, extend through a tubular casing u formed on the back of the viewing screen casing m. A bellows casing v extends upwards from this tubular casing u to a bracket arm w projecting from the upper end of the spindle slide column b, and a similar bellows casing x extends downwards from the tubular casing u to the base plate k of the feed screw j, and by which together with the tubular casing u the scale bar g and its feed screw j are fully enclosed.

I claim:

1. In a horizontal boring machine, a spindle slide column, a spindle slide displaceable along said column, means for measuring the vertical displacements of said spindle slide along said spindle slide column of said machine, consisting of an upright scale bar of considerably less length than the total range of displacement of said spindle slide and vertically adjustable relatively to said column, means for mounting said upright scale bar on said machine, means for finely vertically adjusting said scale bar relatively to said column, a viewing screen marked with a vernier scale on and displaceable with said spindle slide, means for illuminating a portion of said scale bar, and means for directing an image of the illuminated portion of said scale bar on to said screen.

2. In a horizontal boring machine, a spindle slide column, a spindle slide displaceable along said column, means for measuring the vertical displacements of said spindle slide along said spindle slide column of said machine, consisting of an upright scale bar of considerably less length than the total range of displacement of said spindle slide and vertically adjustable relatively to said column, means for mounting said upright scale bar on said machine, a nut fast with said scale bar, a vertical feed screw mounted on the bed plate of said machine alongside said column and engaged with said nut, a viewing screen marked with a vernier scale on and displaceable with said spindle slide, means for illuminating a portion of said scale bar, and means for directing an image of the illuminated portion of said scale bar on to said screen.

3. In a horizontal boring machine, a spindle slide column, a spindle slide displaceable along said column, means for measuring the vertical displacements of said spindle slide along said spindle slide column of said machine, consisting of an upright scale bar of considerably less length than the total range of displacement of said spindle slide and vertically adjustable relatively to said column, means for mounting said upright scale bar on said machine, means for finely vertically adjusting said scale bar relatively to said column, a casing on and displaceable with said spindle slide, a viewing screen marked with a vernier scale mounted horizontally in the upper end of said casing, an electric lamp in the lower end of said casing illuminating a portion of said scale bar, and an optical system and a mirror directing an image of the illuminated portion of said scale bar on to said screen.

4. In a horizontal boring machine, a spindle slide column, a spindle slide displaceable along said column, means for measuring the vertical displacements of said spindle slide along said spindle slide column of said machine, consisting of an upright scale bar of considerably less length than the total range of displacement of said spindle slide and vertically adjustable relatively to said column, means for mounting said upright scale bar on said machine, a nut fast with said scale bar, a vertical feed screw mounted on the bed plate of said machine alongside said column and engaged with said nut, a casing on and displaceable with said spindle slide, a viewing screen marked with a vernier scale mounted horizontally in the upper end of said casing, an electric lamp in the lower end of said casing illuminating a portion of said scale bar, and an optical system and a mirror directing an image of the illuminated portion of said scale bar on to said screen.

5. In a horizontal boring machine, a spindle slide column, a spindle slide displaceable along said column, means for measuring the vertical displacements of said spindle slide along said spindle slide column of said machine, consisting of an upright scale bar of considerably less length than the total range of displacement of said spindle slide and vertically adjustable relatively to said column, means for mounting said upright scale bar on said machine, a nut fast with said scale bar, a vertical feed screw mounted on the bed plate of said machine alongside said column and engaged with said nut, a casing on and displaceable with said spindle slide, a viewing screen marked with a vernier scale mounted horizontally in the upper end of said casing, an electric lamp in the lower end of said casing illuminating a portion of said scale bar, an optical system and a mirror directing an image of the illuminated portion of said scale bar on to said screen, a tubular casing on said viewing screen casing and through which said scale bar and feed screw extend, and bellows casings extending upwards and downwards from said tubular casing and enclosing said scale bar and feed screw.

HENRY WARD LIONEL KEARNS.

REFERENCES CITED

The following references are of record in the file of this patent:

UNITED STATES PATENTS

| Number | Name | Date |
|---|---|---|
| 1,357,731 | Schaper | Nov. 2, 1920 |
| 1,502,443 | Schaper | July 22, 1924 |
| 1,974,606 | Fassin | Sept. 25, 1934 |
| 2,110,958 | Lindener | Mar. 15, 1938 |
| 2,311,142 | Turrettini | Feb. 16, 1943 |
| 2,422,611 | Becker et al. | June 17, 1947 |
| 2,485,355 | Brennan | Oct. 18, 1949 |
| 2,488,351 | Turrettini | Nov. 15, 1949 |